July 12, 1960  G. H. JONES  2,944,465
CHIP COLLECTOR FOR MILLING MACHINE
Filed June 28, 1955  2 Sheets-Sheet 1

INVENTOR.
Gordon H. Jones
BY
Carlson, Pitzner, Hubbard & Wolfe
Atty's

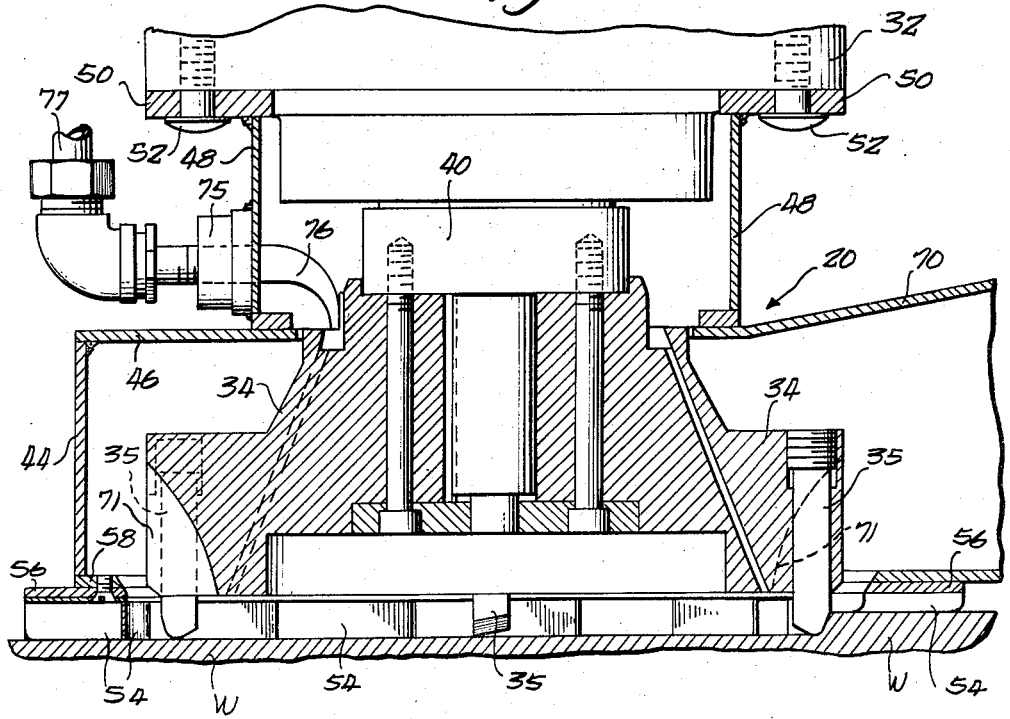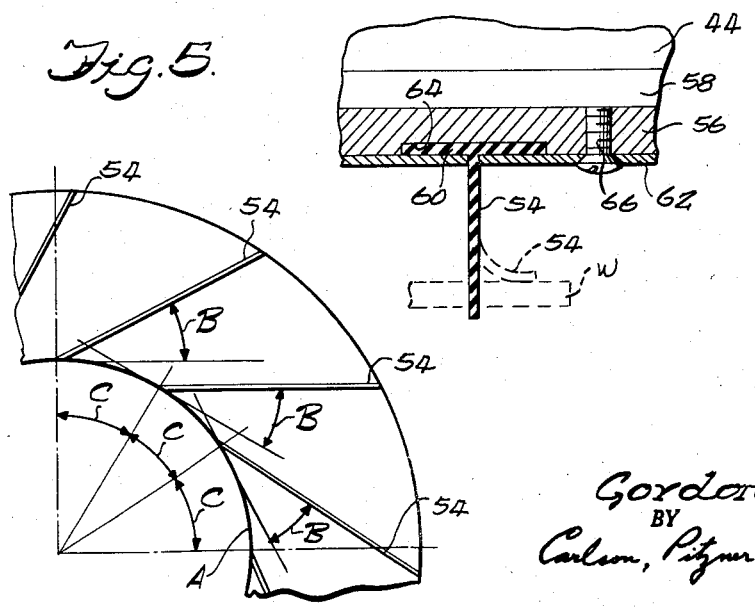

United States Patent Office 2,944,465
Patented July 12, 1960

2,944,465

CHIP COLLECTOR FOR MILLING MACHINE

Gordon H. Jones, Fond du Lac, Wis., assignor to Giddings & Lewis Machine Tool Company, Fond du Lac, Wis., a corporation of Wisconsin Filed June 28, 1955, Ser. No. 518,440

6 Claims. (Cl. 90—11)

The present invention pertains in general to machine tools and, more specifically, to a novel arrangement for removing the chips produced by high speed face milling of light weight and highly machinable metals in a milling machine.

The invention finds particular, but not exclusive, utility when applied to a skin miller such as the machine disclosed in the co-pending application of Jesse Daugherty and William H. Sorensen, Serial No. 239,158, filed July 28, 1951, now abandoned and superseded by application Serial No. 576,473, filed April 5, 1956, now United States Patent No. 2,849,927, and assigned to the assignee of the present invention.

One object of the present invention is to provide a chip collector of the character set forth which is adapted to confine the large volume of flying chips produced by a high speed face type milling cutter to an immediate circumferential area surrounding the cutter and to efficiently remove the chips from this area.

Another object of the invention is to provide a collector of the type set forth which is adapted for installation on a planer type milling machine when used with a face or surface type cutting tool, and which is effective in its operation regardless of whether the cutter head is moving longitudinally or laterally relative to the table.

A further object is to provide a collector of the above character and having associated therewith means for following the contour of the workpiece in the area close to the cutter head to prevent the escape of flying chips and to facilitate the collection of the same.

Still another object is to provide a collector of the foregoing type which completely surrounds the cutter head and which provides for the rapid flow of air between the work and the collector to increase the agitation of the chips and facilitate their removal.

Still a further object is to provide a collector of the above character and including chip deflecting and containing means which are replaceable to accommodate for wear caused by flying chips and rough surfaces.

Other objects and advantages will become apparent as the following detailed description proceeds, taken in collection with the accompanying drawings wherein:

Fig. 3 is a vertical sectional view taken through the milling cutter and accompanying chip collector.

Fig. 4 is an enlarged fragmentary transverse sectional view through the illustrative chip conveyor showing a chip deflecting member.

Fig. 5 is a diagrammatic view of the location of the deflecting members on the chip collector.

Figure 1:
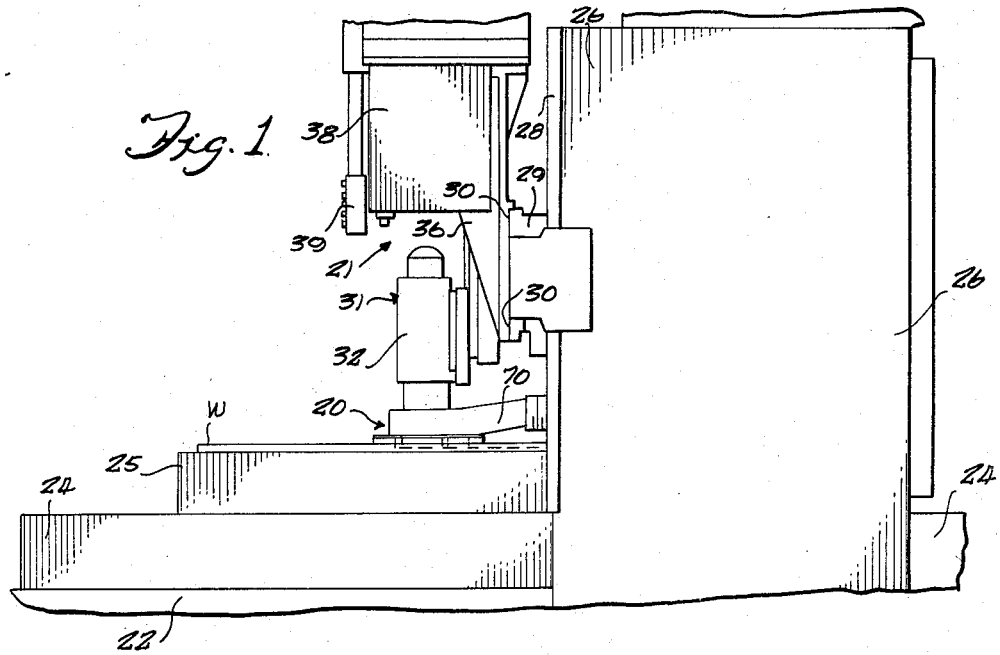
Figure 1 is a side elevational view of an illustrative milling machine equipped with a chip collector exemplifying the present invention.

While the invention is susceptible of various modifications and alternative constructions, a certain illustrative embodiment has been shown in the drawings and will be described below in detail. It should be understood however, that there is no intention to limit the invention to the specific form disclosed, but on the contrary the intention is to cover all modifications, alternative constructions and equivalents falling within the spirit and scope of the invention as expressed in the appended claims.

Referring more specifically to the drawings, the invention is there shown embodied in an illustrative chip collector 20. In the present instance the collector 20 is mounted on a relatively large, high speed, planer type milling machine 21 such as the machine disclosed in the co-pending application, Serial No. 239,158, mentioned earlier herein.

Figure 2:
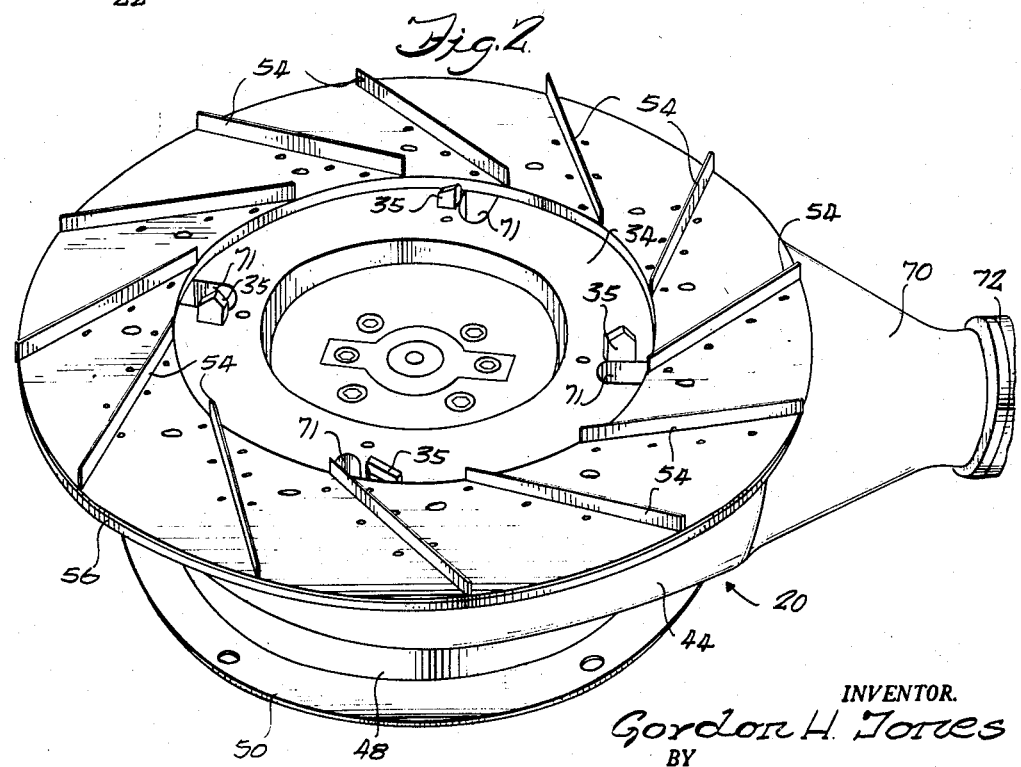
Fig. 2 is an enlarged perspective view showing the face type milling cutter and surrounding chip collector, including the removable deflectors.

By way of introduction to a description of the collector 20, it will be helpful to consider briefly certain general features of the machine 21 which in this case happens to constitute the environment in which the collector 20 is used. As indicated more particularly in Figure 1, the machine 21 comprises a bed 22 having appropriate horizontal ways (not shown) which slidably support a table 24 adapted to reciprocate longitudinally of the bed. Mounted on the table 24 for bodily movement therewith is a relatively flat box like vacuum fixture 25 which holds a workpiece W for processing by the machine 21. The workpiece W is in the form of a flat slab or sheet of light weight and highly machinable metal, such as an aluminum alloy. Straddling the bed 22 and located at the central region thereof are a pair of spaced apart upstanding columns 26. The front faces of the columns 26, shown on the left in Figure 1, are provided with vertical ways 28 which are engaged by a hollow box like cross rail 29 adapted to be traversed vertically therealong. The front face of the cross rail 29 is provided with horizontally extending guide ways 30 which are adapted to carry one or more headstocks 31. Each of the headstocks 31 is equipped with a driving motor 32 which drives a high speed cutter head 34 having a plurality of cutters 35 in the face thereof (Fig. 2). Rigidly fixed to the cross rail 29, as by means of upstanding brackets 36, is a service housing 38 which extends substantially the length of the cross rail and is disposed in overlying relation with the same. The housing 38 contains means for feeding the various services such as electric power, hydraulic pressure, cooling water, and compressed air to the headstocks 31 in a manner permitting the same to be traversed along the ways 30 of the cross rail 29. The housing 38 also supports a movable control pendant 39 which can also be traversed longitudinally of the cross rail.

Turning now to the general structural aspects of the chip collector 20 as shown in Figs. 2 and 3, it will be perceived that the same comprises a generally cylindrical shroud 44 positioned around the periphery of the cutter head 34 to contain the flying chips produced thereby. A door (not shown) is desirably provided in a wall of the shroud 44 for conveniently obtaining access to the cutter bits 35 without necessitating complete removal of the shroud. The shroud is provided with an inwardly projecting annular collar 46, the opening of which is of sufficient size to provide a close fitting relationship between the collar and the rotating cutter head 34 projecting therethrough. This close fitting relationship effectively prevents the passage of chips between the head and the shroud while permitting the free rotation of the head therein. The shroud is mounted on the headstock motor by means of a cylindrical casing 48 which is rigid with the collar 46 at one end and provided with an annular shoulder 50 at its other end. This shoulder is adapted to be secured to the underside of the motor housing by means of bolts 52 or the like.

Provision is made for intercepting the flying chips thrown radially from the cutter, to prevent their escape between the lower edge of the shroud and the workpiece, and for admitting air so that there is a high velocity flow thereof across the surface of the workpiece to entrain the intercepted chips. Provision is also made for accommodating the shroud to the feed movement of the cutter head and to the contour of the workpiece. These provisions are accomplished in the present instance by the use of a plurality of flexible vanes 54 which depend from an annular deflector plate 56 secured to a flange 58 integral with the lower edge of the shroud. The vanes are of sufficient depth to extend slightly beyond the tips of the cutter bits 35 so that they engage the workpiece W after it has been machined as well as before it has been machined. The flexibility of the vanes permits them to conform to surface irregularities in the workpiece, as shown in Fig. 4.

The flexible vanes are illustrated in the drawings as being made of a material such as rubber or rubber laminated cloth. It should be understood, however, that other suitable, flexible materials could be used, as could brushes or the like having closely spaced bristles. The use of the brush material which can easily be made of an abrasion resistant metal, will prolong the life of the flexible vanes, although the initial installation would be more expensive. Similarly, a wear resistant sheet can be provided on the inner surface of each vane to reduce the abrasive effects of the flying chips. The vanes, regardless of the type of material used, are formed with a head portion 60 adapted to be secured to the deflector plates 56 by means of mounting plates 62. For this purpose a slot 64 is provided in the deflector plate into which the head 60 of the vane is inserted. The mounting plates 62 extend over this head to abut the downwardly extending portion of the vane and are fastened in place by means 66 such as screws, rivets or the like. The mounting for the vane may take an alternate form such as a dove-tailed groove and mating head, or the vane heads may be fastened directly to the deflector plate.

In order to prevent the chips formed by the cutter from escaping radially from between the vanes, the vanes are positioned on the lines forming a plurality of secants to a circle described by the inner circumference of the annular deflector plate. An appropriate layout for positioning the vanes on the deflector plate is shown in Fig. 5. The vanes 54 are shown as positioned on the annular deflector plate so as to intersect the inner edge "A" thereof, and form secants to the circle defined by the line A. Each of the lines makes an angle B with a line tangent to the circle A at the point of intersection therewith. The vanes intersect the circle A at equal angles, the points of intersection being spaced apart in equal amounts described by the angle C. In the illustrative chip collector shown in Figs. 1–3, the angle B is equal to approximately 42° and the angle C is equal to 30°. It should be understood, however, that while these particular angles have been found to be effective in stopping the radial passage of chips while permitting a relatively free circulation of air, other angles could be used to effectuate this same result.

For purposes of effecting a complete removal of the chips from within the shroud, a vacuum conduit 70 is provided on one side thereof to exhaust the air and to carry the chips away from the cutting head. The particular vane configuration previously described will give a swirling effect to the air passing through the shroud and thereby aid in the removal of the chips. Cut-out portions 71 are provided on the cutting head 34 in front of each cutter 35 to prevent the piling and sticking of chips in front of each cutter, with the possible clogging of the annular passage between the cutting head and the shroud through which the chips must pass to the vacuum exhaust system (Figs. 2 and 3).

The vacuum conduit 70 leading from the shroud 20 is connected to the vacuum exhaust system by means of a flexible hose or coupling 72 of the type which will permit the shroud to be moved with the cutting head as it travels over the surface of the work.

A boss 75 is provided on the casing wall 48 to permit the insertion of a nozzle 76 suitable for conducting coolant from the conduit 77 to the cutting head 34 when it is desired to use a liquid coolant for aiding in the machining of the workpiece.

I claim as my invention:

1. In a chip collector for use with a high speed rotary face type cutting tool for machining the surface of a light weight and highly machinable metal workpiece, the combination comprising means for collecting chips produced by the cutting tool, and means for creating an air flow through said chip collecting means to remove the chips therefrom, said chip collecting means including a plurality of depending flexible elongated vanes disposed secantially with respect to the rotary cutting tool and extending outwardly therefrom in a direction opposite to the direction of tool rotation for cooperating with the surface of the workpiece being machined to prevent the escape of flying chips and for directing the flow of air over the workpiece surface to entrain the intercepted chips and facilitate their removal.

2. In a machine tool for machining the surface of a workpiece, the combination comprising a headstock mounting a high speed rotary face type cutting tool for removing chips of metal from the workpiece surface, a chip collecting housing mounted on said headstock and surounding said cutting tool, a chip deflecting plate secured to said housing and closely overlying the workpiece surface, means providing a flow of air through said housing from between said plate and said surface for removing chips collected in said housing, and a plurality of flexible elongated chip deflecting vanes depending from said chip deflecting plate into engagement with the workpiece surface being machined, said vanes being disposed secantially with respect to the rotary cutting tool and extending outwardly therefrom in a direction opposite to the direction of tool rotation thereby to intercept flying chips from said high speed cutting tool and for directing the flow of air over the surface being machined to facilitate the removal of chips therefrom.

3. In a machine tool for machining the surface of a workpiece, the combination comprising, a headstock mounting a high speed face type cutting tool rotatable in one direction for removing chips of metal from the workpiece surface, a generally cylindrical chip collecting housing mounted on said headstock and surrounding said cutting tool, an annular chip deflecting plate secured to said housing and closely overlying the workpiece surface around the portion being machined, means providing a flow of air through said housing from between said plate and the workpiece surface for removing chips collected in said housing, and a plurality of flexible elongated chip deflecting vanes depending from said chip deflecting plate and disposed generally secantially around said plate and extending outwardly in a direction opposite to the direction of rotation of said cutting tool and for directing the flow of air over the surface being machined to facilitate the removal of chips therefrom.

4. In a machine tool for machining the surface of a workpiece, the combination comprising, a high speed rotary face type cutting tool rotatable in one direction for removing chips of metal from the workpiece surface, a generally cylindrical chip collecting housing surrounding said cutting tool and having an annular chip deflecting plate mounted on its lower edge parallel to and spaced from the workpiece surface, means providing a flow of air through said housing from between said plate and said surface for removing chips from said housing, a plurality of flexible elongated chip deflecting vanes depending from said plate and engaging the workpiece surface around the portion being machined, said vanes being disposed generally secantially around said plate and extending outwardly in a direction opposite to the direction of rotation of said cutting tool for intercepting flying chips produced by said high speed cutting tool and for directing the flow of air over the surface being machined to facilitate removal of chips therefrom.

5. A chip collector for use with a machine tool having a high speed rotary face type cutting tool for removing chips of metal from the surface of a workpiece, said chip collector comprising in combination, a chip collecting housing mountable on said machine tool in surrounding relation with said rotary cutting tool, an annular chip deflecting plate secured to said housing for closely overlying the workpiece surface, means providing a flow of air through said housing from between said plate and said surface for removing chips collected in said housing, and a plurality of flexible elongated chip deflecting vanes depending from said plate and adapted to engage the workpiece surface around the portion being machined, said vanes being disposed generally secantially around said plate and extending outwardly in a direction opposite to the direction of the cutting tool for intercepting flying chips from said high speed cutting tool and for directing the flow of air over the surface being machined to facilitate removal of chips therefrom.

6. The chip collector of claim 5 wherein means are provided for mounting said depending flexible elongated chip deflecting vanes individually on said chip deflecting plate thereby facilitating removal and replacement of worn vanes.

References Cited in the file of this patent

UNITED STATES PATENTS

| | | |
|---|---|---|
| 1,119,392 | Bernett | Dec. 1, 1914 |
| 1,405,922 | Knowles | Feb. 7, 1922 |
| 1,531,905 | Dacke | Mar. 31, 1925 |
| 1,982,592 | Dobyne | Nov. 27, 1934 |
| 2,143,970 | Blood | Jan. 17, 1939 |
| 2,355,221 | Knight | Aug. 8, 1944 |
| 2,663,893 | Percy | Dec. 29, 1953 |
| 2,801,437 | Okun | Aug. 6, 1957 |

FOREIGN PATENTS

| | | |
|---|---|---|
| 804,307 | France | July 27, 1936 |
| 1,059,102 | France | Nov. 10, 1953 |